United States Patent [19]

Whatley

[11] Patent Number: 4,531,774
[45] Date of Patent: Jul. 30, 1985

[54] TRUCK TOOL BOX ANCHOR ASSEMBLY

[76] Inventor: Gene Whatley, Rte. 2, Box 282, Hemphill, Tex. 75948

[21] Appl. No.: 472,116

[22] Filed: Mar. 4, 1983

[51] Int. Cl.³ .................. B60R 9/00; B60R 11/00; B60P 7/10
[52] U.S. Cl. .................... 296/37.6; 296/43; 410/77; 410/101; 224/273; 248/499; 248/500
[58] Field of Search ............ 296/37.1, 37.6, 43, 296/164, 167; 410/106, 110, 113, 116, 102, 101, 77, 80, 81, 90, 91; 248/500, 499, 503; 411/75-80, 55; 224/42.32, 42.4, 42.45 R, 273, 924

[56] References Cited

U.S. PATENT DOCUMENTS

| | | | |
|---|---|---|---|
| 1,105,095 | 7/1914 | Nally | 411/195 |
| 3,114,528 | 12/1963 | Forest | 411/55 |
| 3,351,356 | 11/1967 | Clark et al. | 410/116 |
| 3,352,193 | 11/1967 | Lerich | 411/79 |
| 3,421,726 | 1/1969 | Getter | 296/43 |
| 3,475,048 | 10/1969 | McNamee | 296/164 |
| 3,595,125 | 7/1971 | Jacobs | 296/43 |
| 3,623,690 | 11/1971 | Bargman, Jr. | 296/43 |
| 3,779,502 | 12/1973 | Marberg | 410/116 |
| 4,249,684 | 2/1981 | Miller et al. | 410/90 |
| 4,288,011 | 9/1981 | Grossman | 312/DIG. 33 |

Primary Examiner—Robert B. Reeves
Assistant Examiner—Dennis H. Pedder
Attorney, Agent, or Firm—Harvey B. Jacobson

[57] ABSTRACT

An anchor assembly is provided for downward reception in an upwardly opening stake receiving socket formed in the upper marginal edge portion of the wall of a pickup truck load bed. The anchor assembly includes a base plate for disposition within the upper portion of the load bed sidewalls socket and the upper end portion of a pair of depending arms are shiftably supported from opposite marginal edge portions of the base plate for oscillatory movement of the lower end portions of the arms toward and away from each other. The arms may closely oppose corresponding remote wall portions of the socket and an upright elongated fastener is threaded through a central portion of the base plate and includes a lower end portion disposed between the lower end portions of the arms and having an abutment carried thereon. The abutment and the adjacent sides of the arms include coacting slidingly engageable wedge surfaces for wedging the lower end portions of the arms away from each other into tight frictional engagement with the remote wall portions of the socket responsive to upward movement of the abutment relative to the arms upon upward threading of the fastener through the base plate. The upper end of the fastener projects above the base plate and may be used to anchor the tool box bottom wall in overlying position supported from the associated load bed sidewall.

3 Claims, 5 Drawing Figures

U.S. Patent    Jul. 30, 1985    4,531,774
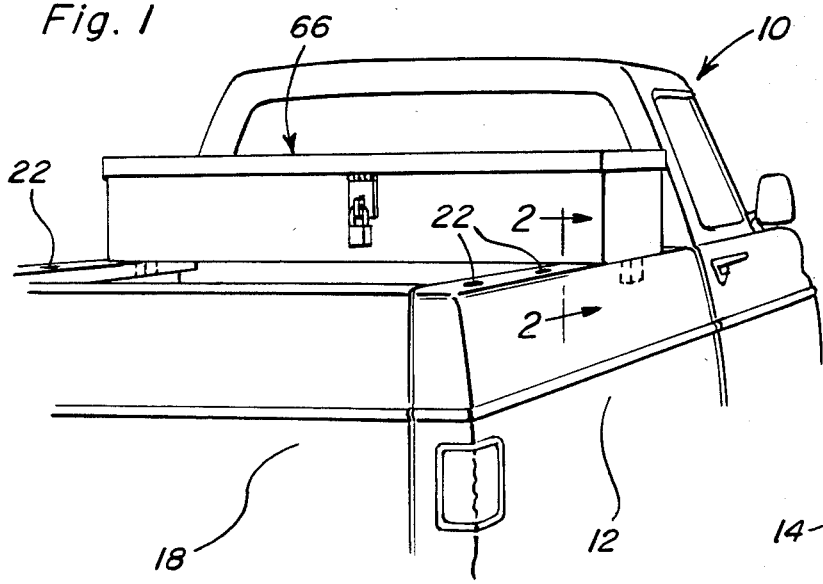
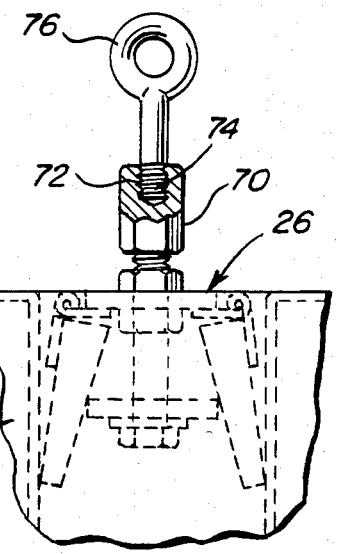
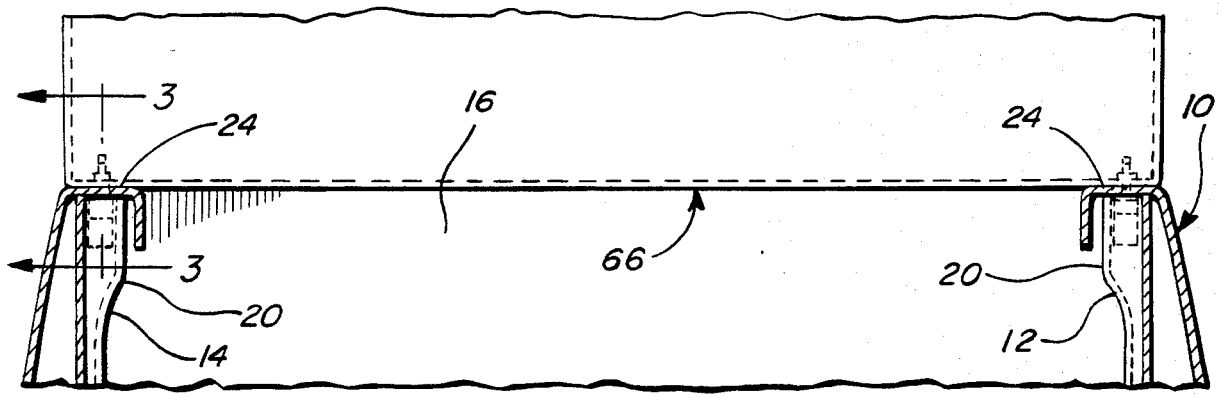
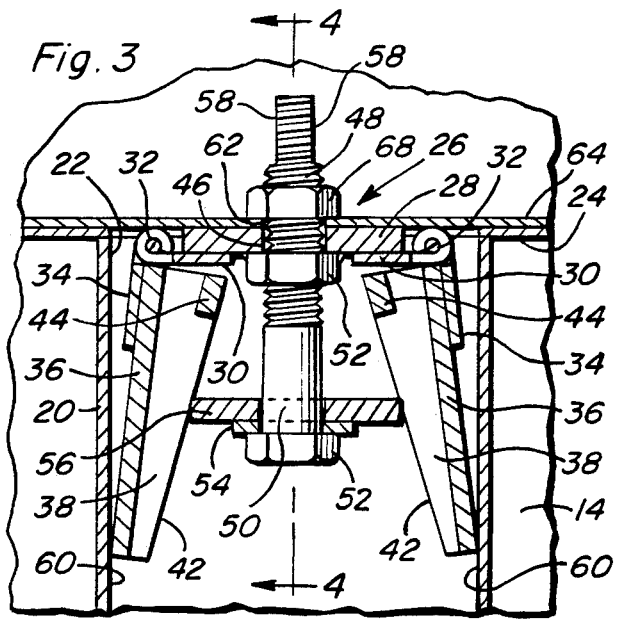
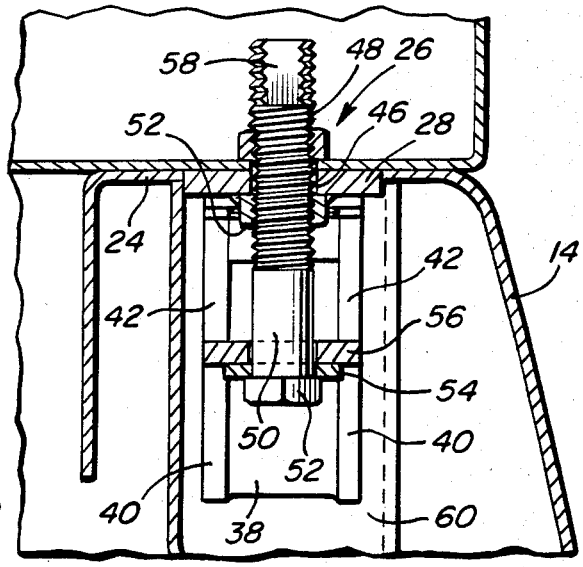

TRUCK TOOL BOX ANCHOR ASSEMBLY

BACKGROUND OF THE INVENTION

Various forms of tool and storage boxes are presently manufactured for support from the upper marginal edges of the sidewalls of pickup trucks. Various fastening structures are provided for securing such tool and storage boxes upon load bed sidewalls, but most of these structures require alteration of the load bed sidewalls, such as by drilling holes therethrough for the reception of anchor fasteners. However, the forming of fastener receiving bores in the upper marginal edges of load bed sidewalls detracts from the resale value of trucks and conventional threaded fasteners secured through sheet metal sidewall upper marginal edge portions tend to eventually upwardly displace the surrounding portions of the sheet metal with the result that the securement of tool and storage boxes thereto becomes loosened. Further, this upward distortion of the sheet metal around fastener receiving bores further reduces the resale value of a truck.

Accordingly, a need exists for an improved form of tool or storage box anchor for use in securing a tool or storage box to upper sidewall portions of a pickup truck load bed. Accordingly, the present invention resides in the provision of an anchor assembly for removable securement in an upwardly opening existing stake receiving socket, which stake receiving sockets are provided on substantially all pickup truck load beds.

Although various forms of socket receiving anchors heretofore have been provided such as those disclosed in U.S. Pat. Nos. 3,595,125, 3,623,690, 3,779,502 and 4,191,108, many of these previously known forms of load bed stake socket receivable anchors are not constructed in a manner such that considerable anchoring force for the support of a heavy tool or storage box from an associated load bed sidewall is provided.

BRIEF DESCRIPTION OF THE INVENTION

The anchor assembly of the instant invention has been specifically designed for removable securement in the upper portion of a stake receiving socket such as that provided in the upper marginal portions of the sidewalls of many pickup trucks. The anchor assembly is heavily constructed and may be used either to securely mount a heavy tool or storage box on a pickup load bed sidewall or as an anchor for tether ropes and straps to be secured over a load disposed within an associated pickup load bed.

The main object of this invention is to provide a heavy duty anchor assembly for removable securement within the upper portion of a stake receiving socket formed in a pickup truck load bed sidewall upper marginal portion.

Another object of this invention is to provide an anchor which may be used not only to anchor a tool or storage box to an associated load bed sidewall but which may alternately be used as an anchor for tie-down straps or ropes to be secured over a load disposed in an associated load bed.

Still another object of this invention is to provide an anchor assembly which will enable high tension fastening means to be utilized in securing the bottom wall of a tool or storage box to the upper marginal portion of a pickup truck load bed sidewall.

A final object of this invention to be specifically enumerated herein is to provide an anchor assembly in accordance with the preceding objects which will conform to conventional forms of manufacture, be of simple construction and easy to use so as to provide a device which will be economically feasible, long lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 1 is a fragmentary perspective view of a conventional form of pickup truck as seen from the right rear corner thereof and with a tool or storage box disposed transverse of the pickup truck load bed illustrated in position as supported from the forward portions of the opposite sidewalls of the load bed;

FIG. 2 is an enlarged fragmentary vertical sectional view taken substantially upon the plane indicated by the section line 2—2 of FIG. 1;

FIG. 3 is a further enlarged fragmentary vertical sectional view taken substantially upon the plane indicated by the sectional line 3—3 of FIG. 2;

FIG. 4 is a fragmentary vertical sectional view taken substantially upon the plane indicated by the section line 4—4 of FIG. 3; and FIG. 5 is a fragmentary enlarged side elevational view illustrating the manner in which the upper end of the threaded shank portion of an anchor assembly constructed in accordance with the present invention may be utilized to support an anchor eye therefrom for anchoring tie-down straps or ropes to the associated load bed sidewall.

DETAILED DESCRIPTION OF THE INVENTION

Referring now more specifically to the drawings, the numeral 10 generally designates a conventional form of pickup truck including upstanding opposite side load bed sidewalls 12 and 14 interconnected at their forward ends by an upstanding transverse front wall 16 and having a swingable tailgate 18 disposed between their rear ends. The walls 12, 14 and 16 as well as the tailgate 18 define the load bed of the pickup truck.

As is conventional, each of the sidewalls 12 and 14 includes integral structures 20 spaced longitudinally therealong defining sockets 22 which open upwardly through the upper marginal horizontal edge or flange portions 24 of the sidewalls 12 and 14.

With attention invited more specifically to FIGS. 3 and 4 of the drawings, the anchor assembly of the instant invention is referred to in general by the reference numeral 26 and includes a single one-piece horizontal base plate 28 which is generally rectangular in configuration. The base plate 28 is downwardly loosely received within an associated socket 22 and the opposite end marginal portions of the base plate 28 have corresponding leaves 30 of a pair of hinges 32 supported therefrom in any convenient manner such as by welding. Each of the hinges 32 includes a second pair of corresponding leaves 34 and the leaves 34 are secured in any convenient manner such as by welding to the outside surfaces of the upper ends of the bight portions 36 of a pair of vertically elongated arms 38 which are generally U-shaped in horizontal cross section and open horizontally toward each other. Each of the U-shaped arms includes a pair of opposite side generally parallel legs 40 interconnected by the corresponding bight portion extending therebetween which project toward the legs of the opposing channel member and the free end edges or surfaces of the legs 40 remote from the bight portions 36 are inwardly and upwardly convergent as at 42 and define wedge surfaces. In addition, the upper ends of each pair of legs 40 are interconnected at their free edge portions by a transverse brace 44 extending and secured therebetween.

The base plate 28 is provided with a central bore 46 upwardly through which the threaded shank portion 48 of upright fastener means in the form of an inverted bolt 50 is slidably received. The undersurface of the base plate 28 has a threaded nut 52 secured thereto as by welding and the threaded shank portion 48 is threaded upwardly through the nut 52 and projects appreciably above the upper surface of the base plate 28. The lower end of the inverted bolt 50 includes an enlarged head 52 and a washer 54 is disposed about the shank portion 48 immediately above the head 52. In addition, a centrally apertured abutment plate 56 is slidably and rotatably mounted on the shank portion 48 immediately above the washer 54 and the abutment plate 56 is generally rectangular in configuration with its opposite end edges opposing the wedge surfaces 42.

The upper end portion of the shank portion 48 projects above the base plate and is provided with rotary torque receivable means in the form of a pair of diametrically opposite flats 58 formed thereon whereby a suitable tool may be nonrotatably engaged with the upper end of the shank portion 48 in order to rotate the latter and thus upwardly thread the shank portion 48 through the nut 52 and the base plate 28. Of course, upward movement of the abutment plate 56 enables the latter to slidably engage the wedge surfaces 42 of the arms 38 and cause the lower end portions of the arms 38 to be displaced outwardly away from each other and into tight frictional engagement with the opposing remote wall portions or surfaces 60 of the socket 22. Accordingly, the anchor assembly 26 may be secured within the socket 22 against longitudinal displacement relative thereto and with the upper surface of the base plate 28 substantially flush with or slightly below the plane of the upper surface of the flange portion 24.

After the anchor assembly 26 has thus been installed within the socket 22, the upper end portion of the shank portion 48 projects upwardly through a bore 62 formed in the bottom wall portion 64 of a tool or storage box referred to in general by the reference numeral 66 to be supported in position spanning the sidewalls 12 and 14. Thereafter, an anchoring nut 68 may be downwardly threaded on the upper end of the shank portion 48 above the bottom wall 64 and turned into tight engagement therewith. In this manner, with the elongated tool or storage box 66 bridging between the forward ends of the sidewalls 12 and 14, a pair of anchor assemblies 26 may be utilized to rigidly anchor the opposite ends of the bottom wall 64 of the box 66 to the front ends of the flange portions 24 of the sidewalls 12 and 14.

If it is desired to use the anchor assembly 26 for anchoring a load retaining strap or rope to associated sidewall, the anchor assembly 26 may be installed as hereinbefore set forth. However, instead of the upper end of the shank portion 48 being passed upwardly through the bore 62 formed in the tool box bottom wall 64, the upper end portion of the shank portion 48 has a fitting 70 equipped with a downwardly opening threaded blind bore downwardly threaded thereon. The upper end of the fitting 70 includes an upwardly opening threaded blind bore 72 and has the externally threaded end of the shank of an anchor eye 76 threadedly engaged therein. In this matter, a load retaining strap or rope end may be readily anchored relative to the sidewall 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a pickup truck load bed including at least one upstanding wall portion defining a horizontal upper marginal edge and a stake socket opening upwardly through said upper marginal edge, a storage box including a bottom wall portion supported from said upper marginal edge, an anchor assembly removably anchored within said socket, said anchor assembly including a single one-piece horizontal base plate disposed within an upper portion of said socket, said base plate including opposite remote marginal portions, each of said marginal portions having the upper end portion of a corresponding depending arm pivotally supported therefrom for swinging movement of the lower end portions of said arms toward and away from each other, said arms closely opposing corresponding remote wall portions of said socket, upright elongated threaded fastener means threadingly secured through a central portion of said plate and including a lower end portion disposed between the lower end portions of said arms, abutment means rotatably mounted on the lower end portion of said fastener means, said abutment means and the adjacent sides of the lower end portions of said arms including coacting slidably engageable surfaces operative to wedge the lower end portions of said arms away from each other and into tight frictional engagement with said remote wall portions of said socket responsive to upward movement of said abutment means relative to said arms upon upward threading of said fastener means relative to said base plate, said bottom wall portion including an opening formed therethrough registered with said socket, the upper end of said fastener means projecting upwardly through said opening, said upper end of said fastener means including rotary torque receiving means spaced above said bottom wall portion adapting said fastener means to have a tool non-rotatably coupled to the upper end thereof for imparting rotary torque to said fastener means, and threaded abutment means threaded on the upper end portion of said fastener means below said rotary torque receiving means and above and bearing downwardly upon said bottom wall portion.

2. The anchor assembly of claim 1 wherein said wedge surfaces include inwardly and upwardly converging wedge surfaces on said arms.

3. The anchor assembly of claim 2 wherein said arms are generally U-shaped in horizontal cross section, open toward each other and define pairs of generally parallel legs interconnected by bight portions extending therebetween said wedge surfaces comprising the free end edges of said legs remote from said bight portions.

* * * * *